United States Patent [19]

von Bieren

[11] 4,446,559

[45] May 1, 1984

[54] LASER WITH ANNULAR RESONATOR

[75] Inventor: Karlheinz von Bieren, Camarillo, Calif.

[73] Assignee: Rockwell International Corporation, El Segundo, Calif.

[21] Appl. No.: 332,564

[22] Filed: Dec. 21, 1981

[51] Int. Cl.[3] ............................................... H10S 3/00
[52] U.S. Cl. ....................................... 372/95; 372/99; 372/98
[58] Field of Search ....................... 378/95, 99, 93, 98, 378/100, 89, 96

[56] References Cited

U.S. PATENT DOCUMENTS

| | | | |
|---|---|---|---|
| 3,969,687 | 7/1976 | Freiberg et al. | 378/95 |
| 3,969,688 | 7/1976 | Freiberg et al. | 372/95 |
| 4,164,366 | 8/1979 | Sziklas et al. | 372/95 |
| 4,170,405 | 10/1979 | Sziklas | 372/95 |

OTHER PUBLICATIONS

"Split-Mode Unstable Resonator;" Freiberg et al; Appl. Optics, vol. 16, No. 5, May 1977.

*Primary Examiner*—William L. Sikes
*Assistant Examiner*—Léon Scott, Jr.
*Attorney, Agent, or Firm*—H. Fredrick Hamann; Harry B. Field

[57] ABSTRACT

The extent of diffraction in a laser resonator is controlled to provide the desired oscillation sustaining feedback. Specifically, a laser system has an annular gain medium disposed about an optical axis. The gain medium has first and second opposite annular ends. A first reflector is disposed on the optical axis closely adjacent to the first end of the gain medium. A second reflector is disposed on the optical axis closely adjacent to the second end of the gain medium. The first and second reflectors are shaped to magnify electromagnetic waves impinging thereon beyond the periphery of one of the reflectors. A sufficiently large portion of the energy incident on an interior region of one of the reflectors to sustain electromagnetic oscillations in the gain medium is diffracted back on itself. In the preferred embodiment, a contoured circular zone plate having a focal point on the optical axis is employed as a diffracting device. The first reflector has a convex surface and the second reflector has a concave surface that together define a focal point that coincides with that of the zone plate.

16 Claims, 7 Drawing Figures

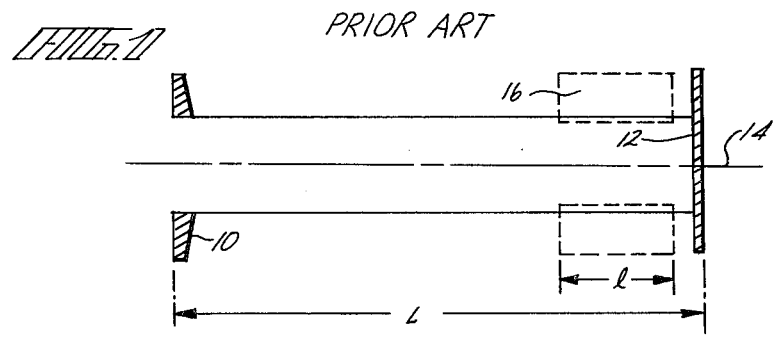
FIG. 1 PRIOR ART
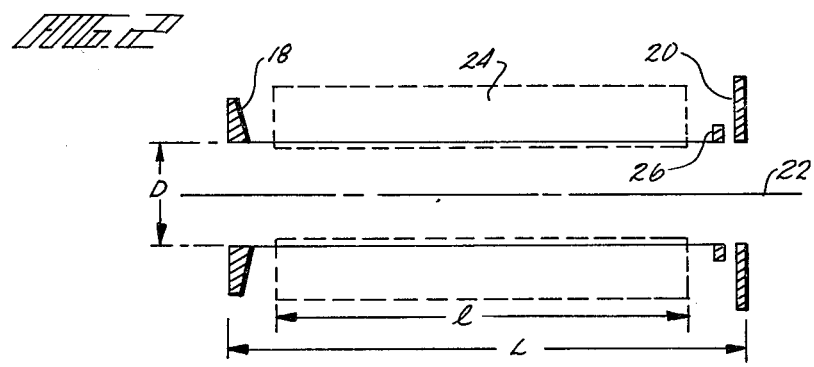
FIG. 2
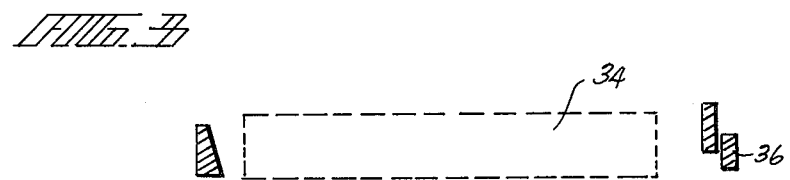
FIG. 3
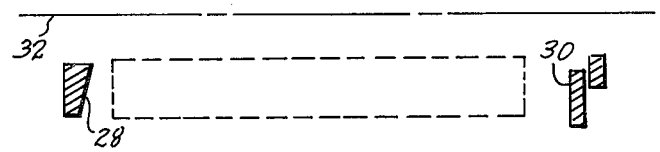
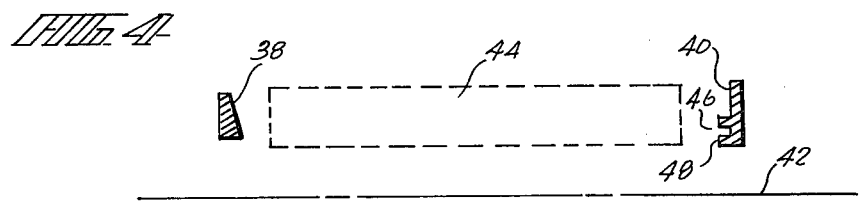
FIG. 4
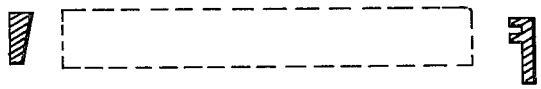

LASER WITH ANNULAR RESONATOR

BACKGROUND OF THE INVENTION

This invention relates to lasers and, more particularly, to a laser having a relatively short, easily controlled annular resonator.

In a laser having a conventional unstable resonator, the generated electromagnetic energy is outcoupled by magnification. In other words, the resonator is designed to cause divergence of the energy passing through the gain medium until such energy spreads beyond the periphery of one of the reflectors of the resonators. The electromagnetic oscillations are sustained by feedback in the form of back reflections along the optical axis of the resonator.

To improve the uniformity of beam intensity in a chemical laser vis-a-vis a solid cylindrical gain medium, an annular gain medium is sometimes employed. In a laser having an annular gain medium and an annular unstable resonator, the feedback necessary to sustain oscillations is provided by diffraction at the inner edge of the reflector annulus. The feedback is increased to a sufficient level by spacing the reflectors of the resonator much further apart than the length of the gain medium, which greatly increases the size of the system vis-a-vis a laser that employs a solid cylindrical gain medium. Attempts have been made to reduce the size of such a laser by employing conical reflectors to fold the optical system of the resonator. Such measures create instability and render mode control difficult.

SUMMARY OF THE INVENTION

According to the invention, the extent of diffraction in a laser resonator is controlled to provide the desired oscillation sustaining feedback. Specifically, a laser system has an annular gain medium disposed about an optical axis. The gain medium has first and second opposite annular ends. A first reflector is centered on the optical axis closely adjacent to the first end of the gain medium. A second reflector is centered on the optical axis closely adjacent to the second end of the gain medium. The first and second reflectors are shaped to magnify electromagnetic waves impinging thereon beyond the periphery of one of the reflectors. A sufficiently large portion of the energy incident on an interior region of one of the reflectors to sustain electromagnetic oscillations in the gain medium is diffracted back on itself. A compact laser system results. In the preferred embodiment, the controlled diffraction is accomplished by a contoured circular zone plate having a focal point on the optical axis. The first reflector has a convex surface and the second reflector has a concave surface that together define a focal point that coincides with that of the zone plate. The described laser system is relatively insensitive to misalignment of the resonator components and readily permits spectral composition and mode control.

BRIEF DESCRIPTION OF THE DRAWINGS

The features of specific embodiments of the best mode contemplated of carrying out the invention are illustrated in the drawings, in which:

FIG. 1 is a schematic diagram of a prior art laser system;

FIG. 2 is a schematic diagram of one embodiment of the invention;

FIG. 3 is a schematic diagram of another embodiment of the invention;

FIG. 4 is a schematic diagram of still another embodiment of the invention;

DETAILED DESCRIPTION OF THE SPECIFIC EMBODIMENTS

Figure 5:
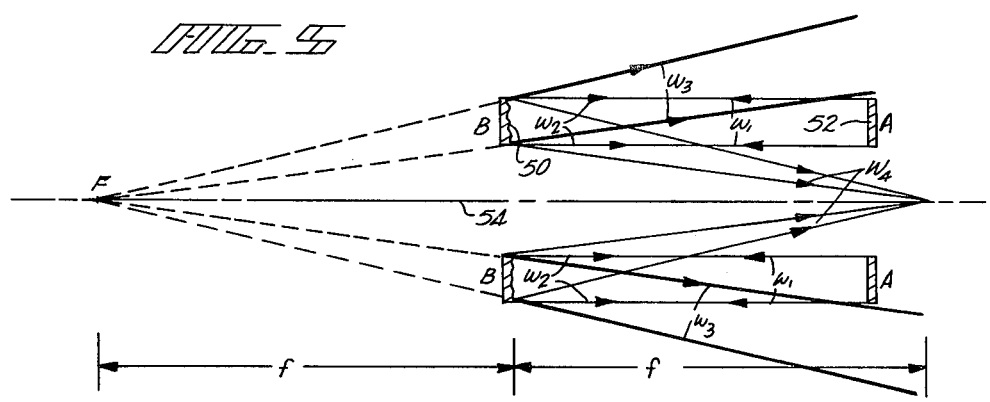
FIG. 5 is a ray diagram of a portion of a resonator incorporating principles of the invention.

FIG. 1 depicts a prior art laser system having an unstable annular resonator. The resonator comprises a convex spherical annular reflector 10 and a flat reflector 12 centered about an optical axis 14 in spaced apart relationship from each other. An annular gain medium 16 is also centered about optical axis 14. By way of example, gain medium 16 could comprise an energized mixture of hydrogen and fluorine. In such case, gain medium 16 would be produced by a generally cylindrical generator, not shown, disposed within gain medium 16 in axial alignment with optical axis 14. The generator has a plurality of nozzles oriented in a radially outward direction. Fluorine atoms formed by combustion and a diluent escape through some of the nozzles. Hydrogen molecules escape through the remaining nozzles. The nozzles reduce the temperature and pressure of the fluorine atoms and mix the fluorine atoms with the hydrogen to form gain medium 16. Because of the cylindrical arrangement of nozzles, gain medium 16 exhibits rotational uniformity about optical axis 14. Electromagnetic waves, specifically light waves, emitted by gain medium 16 are reflected by the resonator to amplify such waves as they pass back and forth through gain medium 16. Specifically, mirrors 10 and 12 magnify the light waves as they pass back and forth through gain medium 16 until they are outcoupled beyond the periphery of reflector 10. A portion of the emitted light incident on the interior (toward the optical axis 14) surface region of reflector 10 is diffracted back on itself by the discontinuity at the inner circular edge of reflector 10 so as to provide the feedback to sustain the oscillations in gain medium 16. In order to provide sufficient feedback to sustain oscillations in this manner, the spacing between reflectors 10 and 12 must be much greater than the length of gain medium 16. The relationship between these quantities to maintain spacially coherent oscillations is $$L \geq \frac{\pi^2(M-1)^2 D^2}{\lambda} e^{-2g_0 l} \quad (1)$$

where L is the distance between mirrors 10 and 12, l is the length of gain medium 16, M is the magnification of the resonator, D is the diameter of the inner circular edge of reflector 10, $g_o$ is the small signal gain of gain medium 16 and λ is the wave length corresponding to the operating frequency of the laser system. The word "interior," or anything similar, herein signifies "toward the optical axis 14;" the word "outer" or anything similar signifies "radially away from the optical axis 14."

FIG. 2 depicts a modification of the laser system of FIG. 1 incorporating principles of the invention. An annular resonator comprises a convex spherical annular reflector 18 and a flat reflector 20 centered about an optical axis 22 in spaced apart relationship closely adjacent to the ends of an annular gain medium 24. A flat annular reflective ring 26 is centered about optical axis 22 between reflector 20 and the end of gain medium 24. Ring 26 represents a discontinuity that serves to diffract back on itself a portion of the light energy incident thereon to provide the feedback necessary for sustaining oscillations in gain medium 24. Because a substantially greater portion of the electromagnetic energy can be directed back on itself by diffraction from ring 26 than in the prior art arrangement of FIG. 1, the spacing, L, between reflectors 18 and 20 is of the order of the length, l, of gain medium 24. The spacing between reflector 20 and ring 26 is $$h = \tfrac{1}{2} n \cdot \lambda \tag{2}$$

where h is the spacing between reflector 20 and ring 26, n is an integer and $\lambda$ is the wave length corresponding to the operating frequency of the laser system. The diameter of ring 26 is expressed by the formula $$d \leq \frac{2\lambda L}{(M-1)D} \tag{3}$$

where d is the difference between the outer diameter and inner diameter of ring 26, L is the spacing between reflectors 18 and 20, M is the magnification of the resonator, and D is the diameter of the inner circular edge of reflectors 18 and 20 and ring 26.

FIG. 3 depicts another modification of the prior art laser system of FIG. 1 incorporating principles of the invention. An annular resonator comprises a convex spherical annular reflector 28 and a flat annular reflector 30 centered about an optical axis 32 in spaced apart relationship closely adjacent to the ends of an annular gain medium 34. The inside diameter of reflector 30 is larger than that of reflector 28. A flat annular reflective ring 36 is centered about optical axis 32 behind reflector 30 so that reflector 30 lies between ring 36 and the end of gain medium 34. The inner circular edge of reflector 30 forms with ring 36 a discontinuity that diffracts part of the energy incident thereon back on itself to provide the necesary feedback to sustain oscillations.

FIG. 4 depicts another modification of the prior art laser system of FIG. 1 incorporating principles of the invention. An annular resonator comprises a convex spherical annular reflector 38 and a flat annular reflector 40 centered about an optical axis 42 in spaced apart relationship closely adjacent to the ends of an annular ridge-like gain medium 44. Annular elements 46 and 48 protrude from surface of reflector 40 toward gain medium 44. Elements 46 and 48, which could be formed with reflector 40 in a one-piece construction or separate parts mounted thereon, each have a rectangular cross section as depicted in FIG. 4. The flat surface of reflector 40 together with elements 46 and 48 form a series of discontinuities that diffracts back on itself a portion of the energy incident on the interior region of reflector 40 to provide the feedback necessary to sustain oscillations. To provide a larger feedback signal more annular elements would be provided at the surface of reflector 40.

The modifications described in connection with FIGS. 2, 3 and 4 permit the reflectors of the annular resonator to be spaced apart a distance of the order of, but slightly larger than, the length of the annular gain medium. Spectral composition and mode control can be exercised over the laser system of which the annular resonator is a part by adjusting the dimensions of the ring or rings, including their spacing from the flat reflector, e.g., h and d in FIG. 2, and in the case of the resonator of FIG. 4 the number of rings.

Figure 6:
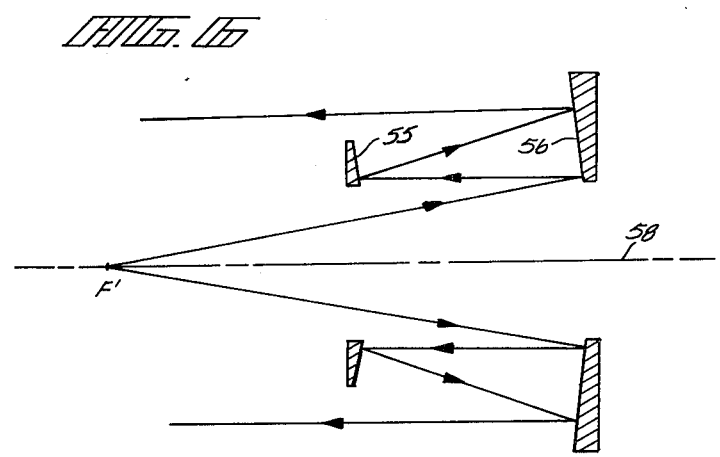
FIG. 6 is a ray diagram of another portion of a resonator incorporating principles of the invention.
Figure 7:
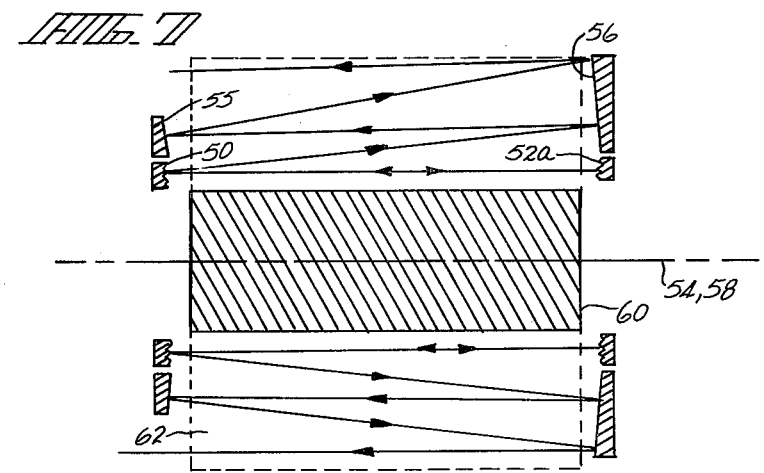
FIG. 7 is a schematic diagram of the preferred embodiment of the invention which incorporates the resonator portions of FIGS. 5 and 6.

Reference is made to FIGS. 5, 6, and 7 for a description of the preferred embodiment of a resonator incorporating the principles of the invention. FIG. 5 depicts the inner, feedback generating portion of the resonator. An annular diffraction grating in the form of a contoured annular reflective zone plate 50 and a flat annular reflector 52 are centered about an optical axis 54 in spaced apart relationship. Although not shown in FIG. 5, a portion of the gain medium lies between zone plate 50 and reflector 52. Preferably, the contour of zone plate 50 moving radially outward from optical axis 54 is sinusoidal, decreasing in wavelength in direct proportion to radial distance from optical axis 54. In such case, the contour of zone plate 50 in a radial coordinate system is expressed by the equation $$P(r) = A \sin\left( \frac{\pi r^2}{\lambda f} + \theta \right) \tag{4}$$

where P(r) is the variation in the surface contour of zone plate 50 parallel to optical axis 54, r is the radial displacement from optical axis 54, A is the maximum amplitude, i.e., depth of the contour, $\lambda$ is the wave length corresponding to the operating frequency of the laser system, f is the local length of zone plate 50, i.e., the distance from zone plate 50 to focal point F, and $\theta$ is the phaseshift introduced by zone plate 50. As is well known in the art, zone plates having different contours can be constructed by holographic techniques. Light waves parallel to optical axis 54 impinging on zone plate 50 (represented by rays $W_1$) are diffracted by zone plate 50 into three orders. One order is diffracted back on itself parallel to optical axis 54 (represented by rays $W_2$). This component of light energy reprsents the feedback necessary to sustain oscillations. After reflection from reflector 52, it returns once again to zone plate 50 where it is diffracted once again. The second diffracted order is diverging outwardly away from optical axis 54 (represented by rays $W_3$), where it is amplified by the remainder of the resonator in the manner described below in connection with FIG. 6. If projected to the left of zone plate 50, as indicated by imaginary lines in FIG. 5, rays $W_3$ would converge at focal point F of zone plate 50, which lies on optical axis 54. The third diffracted order is converging inwardly toward optical axis 54 (represented by rays $W_4$). This component of the diffraction from zone plate 50 is not utilized in the light energy generating process of the laser system, and thus represents energy loss. This component can be minimized by employing a blazed profile for the diffraction rating, i.e., a grating profile in which the individual annular elements are unsymmetrically formed to favor the diverging diffraction component over the converging diffraction component. Typically, the maximum amplitude (A) of the surface contour, is smaller than the minimum wavelength thereof, i.e., the wavelength of the shortest sinusoidal wave, which is the one which lies at the outer edge of zone plate 50. Any number of sinusoidal cycles could be provided on zone plate 50, five being a typical number. The phaseshift parameter of the diffraction grating, $\theta$, is selected so as to establish the necessary phaseshift for sustaining oscillations, namely a total phaseshift between zone plate 50 and reflector 52 of $2\pi n$, where n is an integer.

FIG. 6 depicts the outer amplifying and magnifying portion of the reflector. A convex annular reflector 55 and a concave annular reflector 56 are centered about an optical axis 58 in spaced apart relationship. The surfaces of reflectors 55 and 56 are shaped to define a focus F' on optical axis 58 and to reflect from reflector 56 parallel rays beyond the periphery of reflector 55, as shown in FIG. 6. The surfaces of reflectors 55 and 56 are also shaped so that their focal point, F', coincides with focal point, F, of zone plate 50 when reflector 55 lies adjacent to the perimeter of reflector 50 and reflector 56 lies adjacent to the perimeter of reflector 52. A gain medium, not shown, occupies the space between reflectors 55 and 56 through which light waves pass during their amplification and magnification.

FIG. 7 depicts the inner and outer portions of the resonator together in a complete laser system. Optical axis 54 is aligned with optical point F'. A generally cylindrical generator 60 axially aligned with optical axes 54 and 58 produces an annular gain medium 62 in the space between the described components of the resonator. To make the described resonator insensitive to misalignment with the respect to optical axes 54 and 58, a retroreflective annular grating 52a is substituted for reflector 52. Grating 52a could have a triangular profile with an apex angle of 45°. The path of travel of light rays initially traveling parallel to optical axes 54 and 58 through the resonator is depicted by the arrows in FIG. 7.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, other means for diffracting a portion of the light emitted by the gain medium could be employed. Particularly, diffraction ratings having profiles other than sinusoidal could be employed. Although it is assumed that the various arrangements disclosed herein exhibit rotational symmetry about the optical axis, and such symmetry is generally preferred, it is not necessary. The gain medium and resonator could exhibit an oblong or elliptical cross-section transverse to the optical axis, or suitable lasing materials, other than hydrogen and fluorine could be employed as the gain medium.

What is claimed is:

1. A laser system comprising:
   means for establishing an annular gain medium region disposed about an optical axis, the gain medium region having first and second opposite annular ends;
   a first reflector centered on the optical axis closely adjacent to the first end of the gain medium region;
   a second reflector centered on the optical axis closely adjacent to the second end of the gain medium region, the first and second reflectors shaped to magnify electromagnetic waves impinging thereon beyond the periphery of one of the reflectors; and
   diffracting means for diffracting back on itself a portion of the energy which is directed upon the diffracting means from an interior region of one of said reflectors, said portion of diffracted energy being sufficiently large to sustain electromagnetic oscillations in the gain medium.

2. The system of claim 1, in which the annular gain medium has a cylindrical length l, and the first and second reflectors are spaced apart a distance L, where L is the same order of magnitude but slightly larger than l.

3. The system of claim 1, in which the diffracting means comprises an annular zone plate having a diffracting surface.

4. The system of claim 3, in which the surface of the zone plate has a sinusoidal profile along any radially taken cross-section.

5. The system of claim 4, in which the sinusoidal profile of the zone plate has a wavelength that decreases proportionately away from the optical axis.

6. The system of claim 5, in which the sinusoidal profile decreases in wavelength radially outward from the optical axis and the minimum wavelength of the profile is larger than the maximum amplitude thereof.

7. The laser system of claim 6, in which the first reflector has an annular outer region with a convex surface, the second reflector has annular outer region with concave surface, reflections from the facing surfaces of the first and second reflectors together define a reflector focal point lying approximately on the optical axis, and the diffracting means has a focal point approximately coinciding with the reflector focal point.

8. The system of claim 7, in which the first reflector has an annular interior region on which the zone plate is formed.

9. The system of claim 8, in which the second reflector has an interior region on which a retroreflective diffraction grating is formed.

10. The laser system of claim 1, in which the first reflector has an annular outer region with a convex surface, the second reflector has annular outer region with a concave surface, reflections from the facing surfaces of the first and second reflectors together define a reflector focal point lying approximately on the optical axis, and the diffracting means has a focal point approximately coinciding with the reflector focal point.

11. The system of claim 10, in which the first reflector has an annular interior region on which the diffracting means is formed.

12. The system of claim 11, in which the second reflector has an interior region on which a retroreflective diffraction grating is formed.

13. The system of claim 1, in which the diffracting means comprises a diffraction grating comprising a plurality of closely spaced ridge-like elements.

14. The system of claim 1, in which the first reflector has a convex spherical surface, the second reflector has a flat outer region, and the diffracting means comprises a flat inner region closely spaced from the second reflector toward the gain medium to form a step discontinuity along the optical axis.

15. The system of claim 1, in which the first reflector has a convex spherical surface, the second reflector has a flat outer region, and the diffracting means comprises a flat reflector closely spaced from the second reflector away from the gain medium region to form a step discontinuity along the optical axis.

16. The system of claim 1, in which the first reflector has a convex spherical surface, the second reflector has a flat outer region, and the diffracting means comprises a plurality of annular flat reflectors closely spaced from the second reflector toward the gain medium region to define a plurality of discontinuities transversely to the optical axis.

* * * * *